(12) United States Patent
Ricken et al.

(10) Patent No.: US 9,015,536 B1
(45) Date of Patent: Apr. 21, 2015

(54) INTEGRATION BASED ANOMALY DETECTION SERVICE

(75) Inventors: Mathias G. Ricken, Bremen (DE); Arthur Carré, Seattle, WA (US); Miles C. Kaufmann, Seattle, WA (US); Aaron T. Olds, Seattle, WA (US); Muhammad Ali Siddiqui, Snoqualmie, WA (US); Sanjeev K. Verma, Seattle, WA (US); Kendra A. Yourtee, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 703 days.

(21) Appl. No.: 13/222,850

(22) Filed: Aug. 31, 2011

(51) Int. Cl.
G09F 11/00 (2006.01)
G06F 19/00 (2011.01)

(52) U.S. Cl.
CPC ........................................ G06F 19/00 (2013.01)

(58) Field of Classification Search
CPC ... H04L 41/142; H04L 41/0631; H04L 43/08; G06F 11/008; G06F 11/00; G06F 1/3206; G06F 2209/508; G06F 9/4887
USPC ........................................ 714/47.1, 47.2, 47.3
See application file for complete search history.

(56) References Cited

U.S. PATENT DOCUMENTS

| | | | |
|---|---|---|---|
| 7,076,695 B2 * | 7/2006 | McGee et al. | 714/47.2 |
| 7,380,172 B2 * | 5/2008 | Srinivas et al. | 714/47.1 |
| 7,676,706 B2 * | 3/2010 | Addleman et al. | 714/57 |
| 7,711,987 B2 * | 5/2010 | Agarwal et al. | 714/26 |
| 7,836,356 B2 * | 11/2010 | Haas et al. | 714/47.1 |
| 7,877,645 B2 * | 1/2011 | Meyer et al. | 714/47.1 |
| 7,882,394 B2 * | 2/2011 | Hosek et al. | 714/26 |
| 7,954,090 B1 * | 5/2011 | Qureshi et al. | 717/127 |
| 8,065,568 B2 * | 11/2011 | Watanabe et al. | 714/47.1 |
| 8,375,255 B2 * | 2/2013 | Wang et al. | 714/47.1 |
| 8,381,039 B1 * | 2/2013 | Osiecki et al. | 714/45 |
| 8,499,066 B1 * | 7/2013 | Zhang et al. | 709/223 |
| 2007/0027985 A1 * | 2/2007 | Ramany et al. | 709/224 |
| 2008/0307269 A1 * | 12/2008 | Bennett et al. | 714/47 |
| 2009/0031176 A1 * | 1/2009 | Ide et al. | 714/47 |
| 2009/0037777 A1 * | 2/2009 | Meyer et al. | 714/47 |
| 2010/0083055 A1 * | 4/2010 | Ozonat | 714/47 |
| 2012/0151276 A1 * | 6/2012 | Bjorner et al. | 714/47.1 |

* cited by examiner

*Primary Examiner* — Bryce Bonzo
*Assistant Examiner* — Elmira Mehrmanesh
(74) *Attorney, Agent, or Firm* — Knobbe, Martens, Olson & Bear, LLP

(57) ABSTRACT

Systems and methods are provided for analyzing operating metrics of monitored metric sources. Aspects of the present disclosure may present for display information associated with the monitored metric source and the analysis of its operating metrics. Analysis comprises determination of reference values and tolerance levels which represent allowable deviations from the reference values. Input data includes a measurement of an operating parameter and a time stamp. Input data may be saved to a data store for using in future analysis of other input data. When input data is determined to be outside the tolerance level, notifications may be issued to alert administrators or systems of the anomaly.

24 Claims, 8 Drawing Sheets

INTEGRATION BASED ANOMALY DETECTION SERVICE

BACKGROUND

Modern companies operate servers, personal computers, and other computing devices as a part of their day-to-day operations. In many cases, a significant portion of the company's mission involves the operation of such devices. For example, financial institutions provide customers with up-to-the-minute details about their accounts. Downtime can be inconvenient for customers and cause complaints which reflect poorly on the company. Content providers rely on the operation of their servers to deliver content to their customers. Downtime for these companies can reduce customer interest, potentially reducing demand for advertisements which are often the sole source of the company's revenue. Similarly, network retailers rely on their servers to process orders. Any downtime experienced by these businesses may not just impact their reputation or potentially affect advertising rates, it can also affect revenue when potential customers go elsewhere to make their purchases. These are just a few examples of companies which typically have large groups of servers that are required to operate around the clock.

One problem, among others, that arises when relying on large groups of servers is that it can be difficult to monitor the key operating parameters of each individual machine and determine when an anomaly has occurred or is occurring. Even when the key operating parameters are monitored, it can be difficult to determine which measurements are normal and which measurements are anomalous. Some companies utilize monitoring systems that require them to specify the normal range for measurements of the key operating parameters and the absolute thresholds beyond which the measurements may indicate anomalies. System administrators who configure these monitoring systems determine the normal operating range based on their own anecdotal evidence or on recommendations from other system administrators, whose systems may be operating in an entirely different environment.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Generally described, aspects of the present disclosure relate to providing administrators of servers, client computing devices, and other metric sources with a method for monitoring the metric sources in order to detect anomalous behavior. Specifically, aspects of the disclosure will be described with respect to monitoring the operating parameters of multiple servers to detect whether a particular server is experiencing an anomaly. It will be appreciated that those aspects of this disclosure described with respect to monitoring servers and other computing devices can also apply to any type of metric source. For example, physical inventory can be monitored to determine whether certain aspects of the inventory require attention.

The detection of an anomaly can be based on the activity of the group of servers as a whole, on expected measurements for a specific server, on dynamically calculated targets, and the like. Various user interfaces will be described that enable users, such as system administrators, to view the measurements which have been taken and to configure the operation of the analysis modules that act on those measurements. Although various aspects of the disclosure will be described with regard to illustrative examples and embodiments, one skilled in the art will appreciate that the disclosed embodiments and examples should not be construed as limiting.

Figure 1:
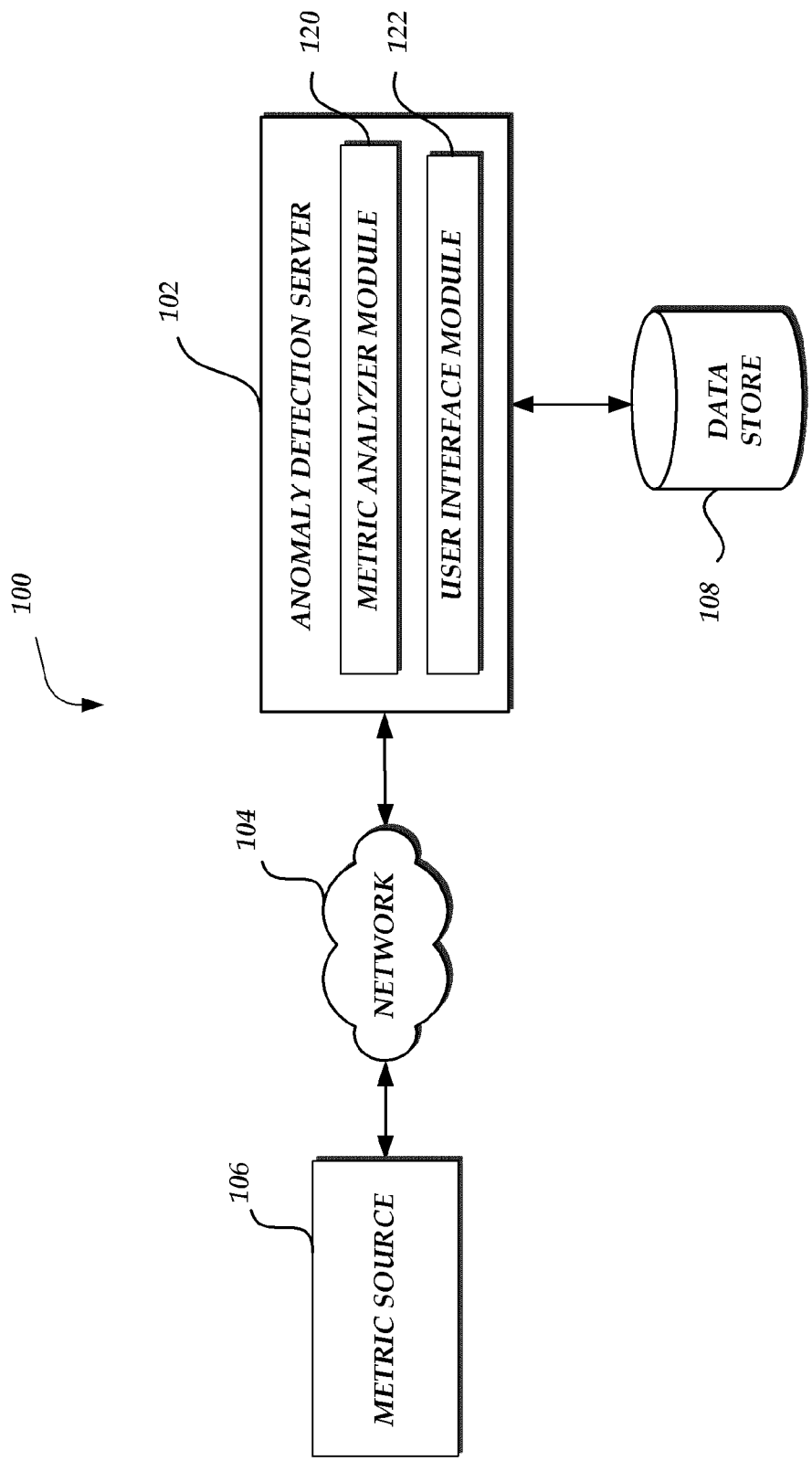
FIG. 1 is a schematic block diagram depicting an illustrative operating environment including a monitored metric source and an anomaly detection server for monitoring operating parameters of the monitored metric source.

FIG. 1 illustrates a system 100 with an anomaly detection server 102 according to the present disclosure. The system 100 is depicted in FIG. 1 as operating in a distributed computer environment comprising several computer systems that are interconnected using one or more computer networks. The system 100 could also operate within a computer system having a fewer or greater number of components than are illustrated in FIG. 1. In addition, the operating environment 100 could include various web services and/or peer-to-peer network configurations. Thus, the depiction of system 100 in FIG. 1 should be taken as illustrative and not limiting to the present disclosure. The system 100 comprises at least one monitored metric source 106, a network 104, an anomaly detection server 102, and a data store 108. The anomaly detection server 102 comprises a metric analyzer module 120 and a user interface module 122. The monitored metric source 106 is in communication with the anomaly detection server 102 over the network 104. Those skilled in the art will recognize that the metric source 106 can be any of a number of computing devices that are capable of communicating over a network including, but not limited to, a laptop, personal computer, personal digital assistant (PDA), hybrid PDA/mobile phone, mobile phone, electronic book reader, digital media player, tablet, and the like. Alternatively, the metric source 106 need not be a computing device. For example, the metric source 106 can be an inventory of physical items. The inventory can be monitored to determine whether certain aspects of the inventory require attention. In some embodiments, properties of the physical inventory can be entered into a computing device that is in communication with the anomaly detection server 102. In yet other embodiments, the metric source 106 may be one or more software applications executing on a single physical or virtual device or across multiple physical/virtual devices. In yet other embodiments, the metric source 106 may be a Web service.

The network 104 can be any wired network, wireless network or combination thereof. In addition, the network 104 may be a personal area network, local area network, wide area network, cable network, satellite network, cellular telephone network, etc. or combination thereof. The anomaly detection server 102 is in communication with the data store 108. The communication can occur over the network 104, a different network, or, alternatively, the data store 108 can be located on the same physical device as the anomaly detection server 102. Moreover, data store 108 can include one or more data stores physically or logically related to each other, or can be implemented as a web service itself.

The anomaly detection server 102 can be configured with a computer executable program or a collection of such programs running on a single device or across a plurality of devices. The programs functioning as the metric analyzer module 120 and user interface module 122 can also be configured to run across a plurality of devices in a distributed computing environment. The configuration can change dynamically according to work load and other parameters. Alternatively, the metric analyzer module 120 and user interface module 122 can be separated and configured to run on separate devices or as separate modules within the same device. In any of these configurations, the metric analyzer module 120 and user interface module 122 can be configured to communicate with each other, either directly, through data stored in the data store 108, or through some intermediary.

In operation, one or more monitored metric sources 106 are configured to send operating data over a network 104 to an anomaly detection server 102. The operating data can be a numerical measurement of an operating parameter, such CPU usage. In some embodiments, the operating parameter can be hard disk usage, network traffic, latency, memory usage, temperature, electrical consumption, logins, requests, transactions, sales, etc. The operating data can contain, in addition to the numerical measurement of an operating parameter, a timestamp representing the time that the measurement of the operating parameter was taken. Upon receipt of the operating data, the anomaly detection server 102 invokes the metric analyzer module 120, described in detail below. Using the instructions of the metric analyzer module 120, the anomaly detection server 102 can load data from the data store 108, and based on the loaded data the anomaly detection server 102 can determine whether the monitored metric source 106 is experiencing anomalous activity. An administrator computing device—whether the same metric source which transmitted operating data or an entirely separate computing device—can request to view information regarding the activities of the anomaly detection server 102 and its analysis of the operating data. Upon receipt of the request, the anomaly detection server 102 invokes the user interface module 122, described in detail below. Using the instructions of the user interface module 122, the anomaly detection server 102 can load data from the data store 108 and generate a display for an administrator computing device. The display can include information the analysis of the operating data, and it can also include interactive controls for further configuring the operation of the anomaly detection server 102.

Figure 2:
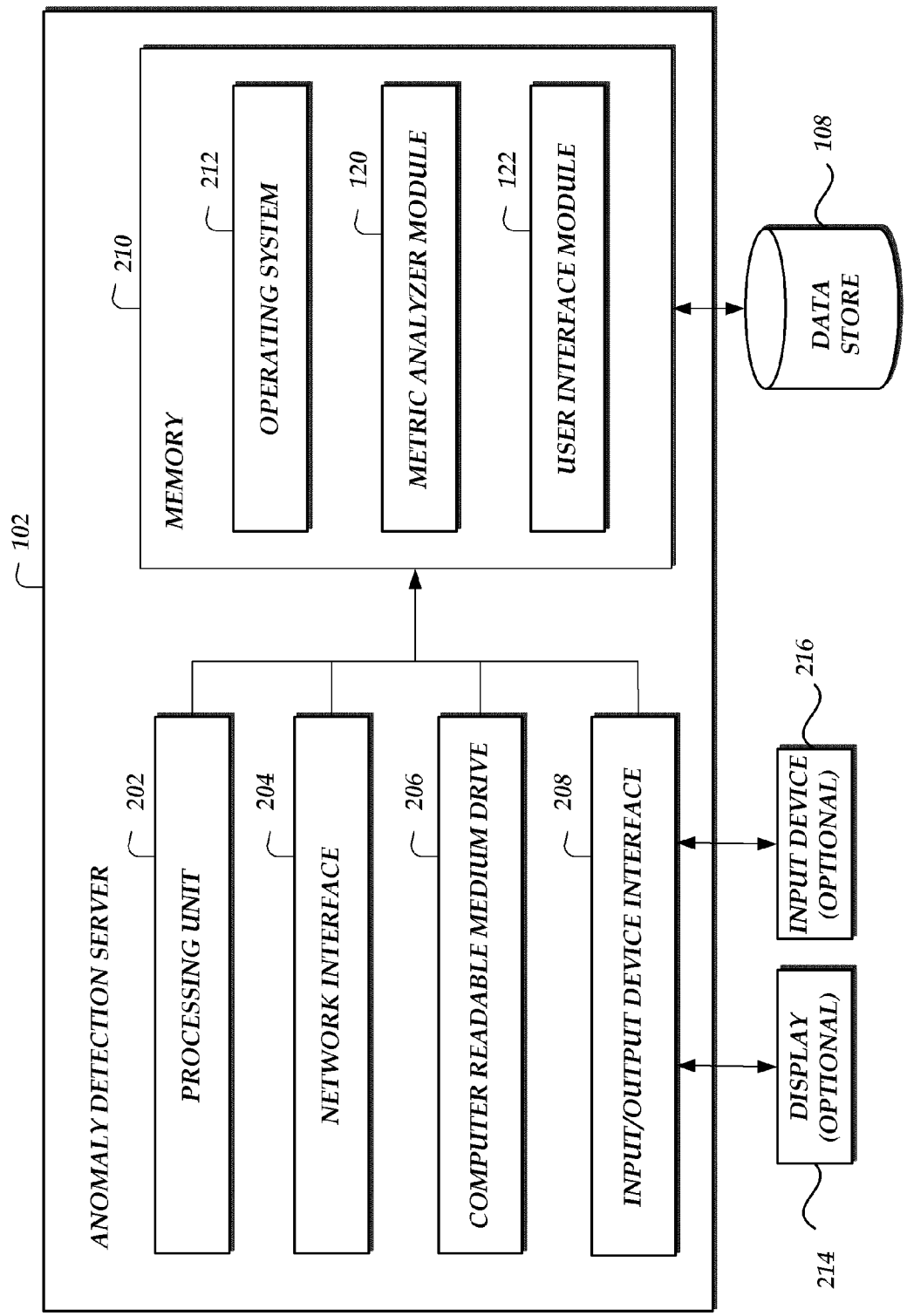
FIG. 2 depicts an example of a general architecture of an anomaly detection server for monitoring operating parameters of a monitored metric source, including a metric analyzer module for determining whether the monitored metric source is experiencing an anomaly, and a user interface module for generating and processing an interface for enabling a user to configure the server anomaly detection server.

Referring now to FIG. 2, one embodiment of an anomaly detection server 102 is illustrated in more detail. The anomaly detection server 102 can be a server or other computing device, and can comprise a processing unit 202, a network interface 204, a computer readable medium drive 206, an input/output device interface 208, and a memory 210. The network interface 204 can provide connectivity to one or more networks or computing systems. The processing unit 204 can receive information and instructions from other computing systems or services via the network interface 204. The network interface 204 can also store data directly to memory 210. The processing unit 202 can communicate to and from memory 210 and output information to an optional display 214 via the input/output device interface 208. The input/output device interface 208 can also accept input from the optional input device 216, such as a keyboard, mouse, digital pen, etc.

The memory 210 contains computer program instructions that the processing unit 202 executes in order to implement one or more embodiments. The memory 210 generally includes RAM, ROM and/or other persistent or non-transitory memory. The memory 210 can store an operating system 212 that provides computer program instructions for use by the processing unit 202 in the general administration and operation of the anomaly detection server 102. The memory 210 can further include computer program instructions and other information for implementing aspects of the present disclosure. For example, in one embodiment, the memory 210 includes a user interface module 122 that generates user interfaces (and/or instructions therefor) for display upon an administrator computing device, e.g., via a navigation interface such as a web browser installed on the administrator computing device. In addition, memory 210 may include or communicate with one or more auxiliary data stores, such as data store 108. In addition to the user interface module 212, the memory 210 can include a metric analyzer module 120 that can be executed by the processing unit 202.

In operation, the anomaly detection server 102 communicates with monitored metric sources 106 over the network 104, as described above. The network interface 204 facilitates such communication for the anomaly detection server 102. Based on the instructions of the metric analyzer module 120 in memory 210, the processing unit 202 can load data from the data store 108 into memory 210, perform calculations on the input from the monitored metric source 106 and the data loaded into memory 210, store the resulting calculations in the data store 108, and perform one or more notification procedures.

Figure 3:
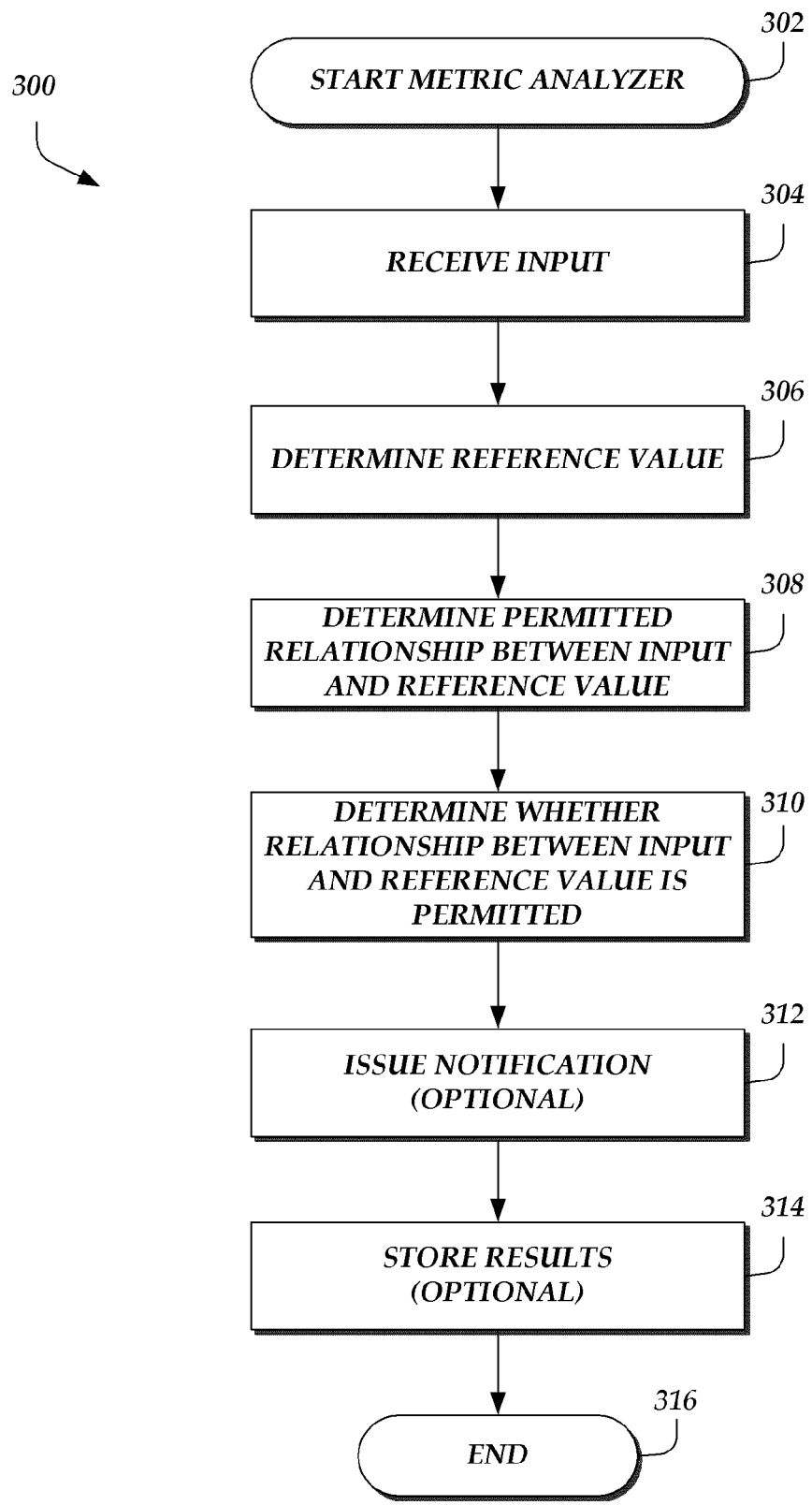
FIG. 3 is a flow diagram of an illustrative routine implemented by the metric analyzer module to determine whether a measurement of an operating parameter of a monitored metric source indicates that the monitored metric source is experiencing an anomaly.

FIG. 3 is a flow diagram of an illustrative metric analyzer 300 implemented by the metric analyzer module 120 to determine whether a monitored metric source 106 is exhibiting anomalous behavior. One skilled in the relevant art will appreciate that the metric analyzer 300 may be implemented by one or many computing devices or components that are associated with the metric analyzer module 120. The metric analyzer 300 is described with respect to determining whether input data from a monitored metric source 106 is null and therefore missing. However, the metric analyzer 300 can be implemented differently without departing from scope of the disclosure, and thus the following illustrative embodiments should not be construed as limiting.

A metric analyzer such as metric analyzer 300 is often useful in determining whether a particular argument or value does not exist with respect to the input data. For example, if the monitored metric source 106 is operating as a file server, one particular operating parameter that might be useful to monitor is available hard drive space. The monitored metric source 106 can be configured to send data about its available hard drive space to the anomaly detection server 102 on a regular basis, for example every minute. If the anomaly detection server 102 determines that the input data representing available hard drive space is null that can indicate an anomaly on the monitored metric source 106.

The metric analyzer 300 illustrated in FIG. 3 begins at block 302 and proceeds to block 304, where the anomaly detection server 102 receives input data from a monitored metric source 106. Input data can consist of a numeric measurement of an operating parameter, an argument that is passed to a function of a different program, or any other variable that can be used to determine the presence of anomalous activity. In one example, the input data includes a measurement of the available hard drive space on the monitored metric source 106 and a timestamp representing the time that the measurement was taken. Upon receipt of the input data from the monitored metric source 106, the input data can be placed into memory 210. In some embodiments, the input data can stored in a data store 108 in addition to being placed into memory 210. This storage of the input data in a data store 108 can facilitate future reporting and troubleshooting.

The metric analyzer 300 then proceeds to block 306, where it determines the reference value. The reference value is the value to which the input data will be compared in block 310, described below. Generally, the reference value may be a model value that is expected under the circumstances. For example, it can be a predicted value, a calculated statistic, a null value, and the like. The reference value can come from the data store 108; be programmed into the metric analyzer module 120; be determined from outside information, and the like. The reference value can then be stored in a processor register or cache, sent to memory 210, or sent to the data store 108. In some embodiments, the data store 108 can include lists of reference values, and each metric analyzer can be associated with one or more reference values. The metric analyzer 300 can determine with which of the reference values it is associated to use during a particular execution based on the time of day or other variables. Returning to the drive space example above, the data store 108 can indicate that the reference value for this metric analyzer 300 is a null value.

The metric analyzer 300 then proceeds to block 308, where it determines the permitted relationship between the input value and reference value. Generally, input data that does not satisfy the permitted relationship with the reference value is considered to be anomalous. For example, the permitted relationship can be a particular number of standard deviations from a statistical mean or a percentile range within which the input data is allowed to fall. The permitted relationship can be a logical relationship between the input data and the reference value, such as greater than, less than, equality, inequality, and the like. In some embodiments, the permitted relationship can be determined dynamically based on environmental variables, such as date and time; programmed into the metric analyzer module 120; loaded from the data store 108; or calculated from data that was loaded from the data store 108. In some embodiments, the data store 108 can include lists of permitted relationships, and each metric analyzer can be associated with one or more permitted relationships. The metric analyzer 300 can determine with which of the permitted relationships it is associated to use during a particular execution based on the time of day. For example, if a monitored metric source 106 is expected to be inactive at night, a permitted relationship of "less than" can be used, in conjunction with a reference value of 10%. In such a combination, any input value for CPU utilization that is greater than 10% may indicate an anomaly because the relationship between the input value and the predicted value is not a permitted relationship at that point in time. A different permitted relationship and/or reference value can be used during daytime hours, when CPU utilization may be expected to experience a different range of measurements. Returning to the drive space example above, the data store 108 can indicate that the reference value for this metric analyzer 300 is null and the permitted relationship is inequality. Therefore, the input value will satisfy the permitted relationship if it is any value other than null.

With these preparations complete, the metric analyzer 300 illustrated by FIG. 3 then proceeds to block 310, where it determines whether the relationship between the input form the monitored metric source 106 and reference value is permitted. In one embodiment, this involves two prongs. First, the anomaly detection server 102 observes the relationship between the input data and the reference value. In this example, where the metric analyzer 300 is being used to determine if the monitored metric source 106 has sent any value representing its available hard drive space, the permitted relationship is inequality and the reference value is null. Therefore, the metric analyzer 300 determines whether the input data is or is not null. The second prong is determining whether the observed relationship is a permitted relationship. In this example, the permitted relationship is inequality. Therefore, if the input data is observed to be equal to the reference value—in this case, when the input data is null—then the observed relationship is not a permitted relationship, which may indicate an anomaly. If the input data is observed to be not equal to the reference value—in this case, when the input data is any value other than null—the observed relationship is a permitted relationship.

The metric analyzer 300 then moves to block 312 in which a notification of a detected anomaly may be issued. For example, a notification of anomaly detection may be issued to a system administrator, another system, etc. In some embodiments, the notification function can be turned on or off dynamically, based on environmental variables, information in the data store 108, how far outside the permitted relationship the input data is, etc. In other embodiments, notifications may be sent on a detection-by-detection basis or sent in association with multiple anomaly detections that have been aggregated together based on type, time period, severity, degree of deviation, etc. One skilled in the art will appreciate that the notification may take a variety of forms, such as an email or other electronic message, pop-up window, dashboard control, error report, etc. without departing from the scope of the present disclosure.

The metric analyzer 300 then moves to block 314 where the results of the current execution of the metric analyzer may be stored in the data store 108 for future use. In some embodiments, the results are stored in memory 210. Whether and how the results are stored can be determined dynamically, based on environmental variables, the value of the input data, the result of the comparison with the reference value, and the like. Finally, the metric analyzer 300 ends at block 316.

Figure 4:
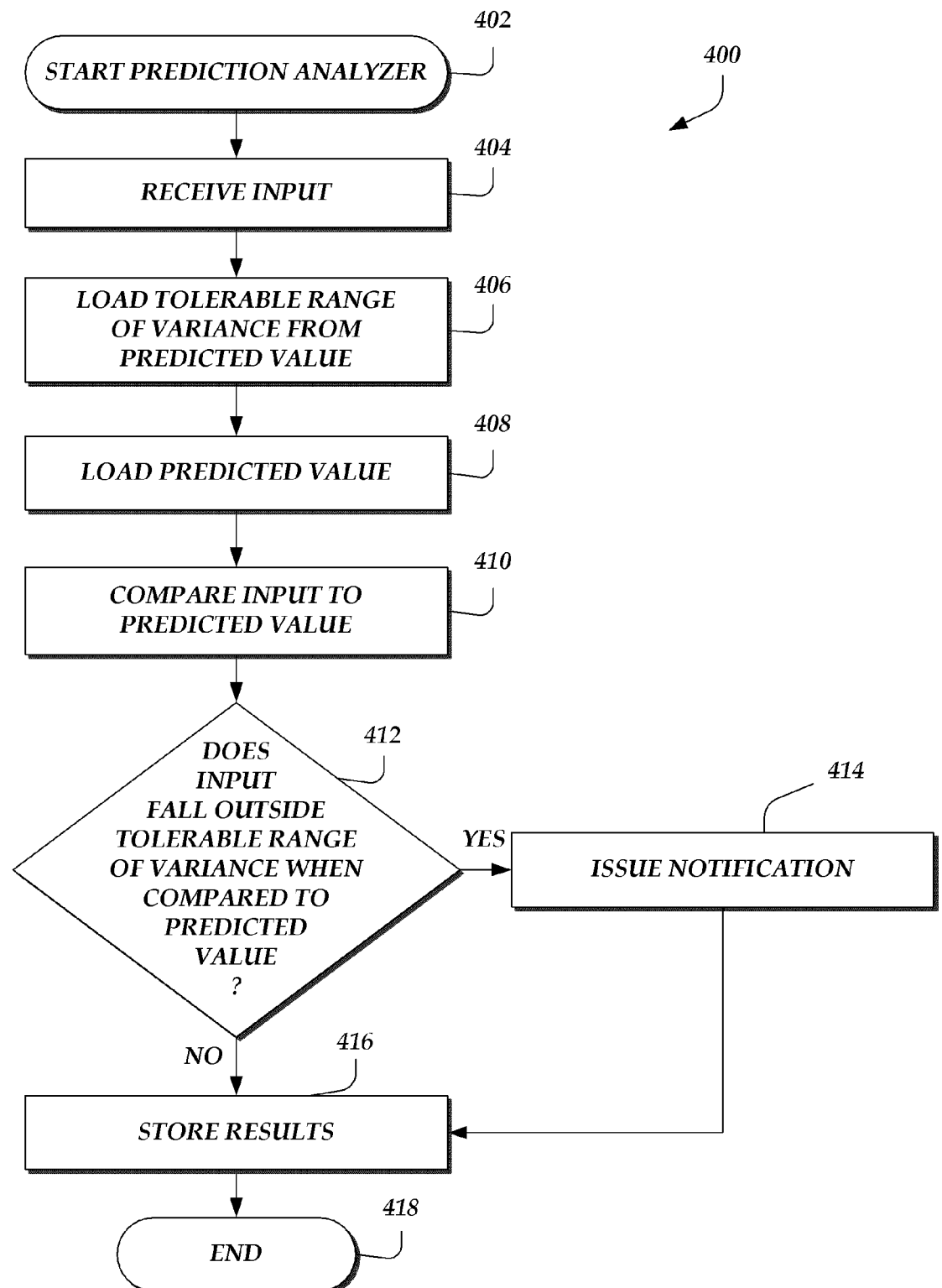
FIG. 4 is a flow diagram of an illustrative routine implemented by the metric analyzer module to determine whether a measurement of an operating parameter of a monitored metric source is outside an acceptable range of deviation from a predicted measurement value.

FIG. 4 illustrates an embodiment of another type of metric analyzer, which may be referred to as a prediction analyzer. Prediction analyzer 400 may be used to determine whether a measurement of an operating parameter of a monitored metric source 106 is outside an acceptable range of deviation from a predicted measurement value. In this embodiment, the metric analyzer module 120 implements the prediction analyzer 400 to determine the relationship of input data to predicted values in order to detect anomalies, rather than simply detecting whether a particular value exists as described above with respect to the metric analyzer 300 illustrated in FIG. 3. Accordingly, the prediction analyzer 400 described below can be used to detect when a particular operating parameter has deviated beyond an acceptable range of variance from an expected measurement. Moreover, the prediction analyzer 400 can be used to derive the expected measurement and the acceptable range of variance dynamically, providing monitoring that is responsive to any number of variables which may have been unknown to the administrator when initially configuring the metric analyzer.

The prediction analyzer 400 can be useful in determining whether a particular operating parameter is within normal operating range. For example, if the monitored metric source's 106 central processing unit (CPU) utilization is measured to be 70% and the predicted value for that date and time is only 50%, the monitored metric source 106 may be experiencing an anomaly. However, the 20% difference may be normal or may be indicative of an anomaly only if it happens for 10 straight data inputs, depending upon the particular environment. Accordingly, in some embodiments, the metric analyzer module 120 can be configured to take into account such considerations. Conversely, it will be appreciated that when the predicted value and the tolerance level are dynamically calculated, anomalies can be detected without prior knowledge of exactly how much of a variance is anomalous or what the proper point of reference is.

The prediction analyzer 400 starts at block 402 and proceeds to block 404. At block 404, the analyzer receives input from a monitored metric source 106. Similar to the metric analyzer 300 illustrated in FIG. 3, the input to the prediction analyzer 400 may consist of an input value representing a measurement of an operating parameter of the monitored metric source 106. In addition, the input data may include a timestamp representing the time when the measurement was taken. In this example, the input data consists of a timestamp and a value of 70%, which represents a measurement of the monitored metric source's 106 CPU utilization at the time represented by the timestamp. The input data can be stored in a processor register or cache, sent to memory 210, and/or stored in a data store 108.

Once the input data is received, the prediction analyzer 400 proceeds to block 406 where it loads the tolerable range of variance from the predicted value. The tolerable range of variance from the predicted value—or tolerance level—is the permitted relationship between the input value and the predicted value. In some embodiments, it is the maximum difference between the input value and the predicted value that is permitted. Greater differences may indicate an anomaly. The tolerable range of variance can be calculated dynamically based on environmental variables such as date and time, loaded from the data store 108, calculated from data in the data store 108, programmed into the metric analyzer module 120, and the like. In this example, the tolerable range of variance is 10 units, and is loaded from the data store 108 where it was saved by a system administrator as described in detail below with respect to FIG. 7.

The prediction analyzer 400 then proceeds to block 408, where it loads the predicted value for the input data. The predicted value can be loaded from the data store 108 or calculated from data loaded from the data store 108. In some embodiments, it can be programmed into the metric analyzer module 120. In yet other embodiments, it can be determined from outside information, imported or received from another system, etc. The predicted value can then be stored in a processor register or cache, sent to memory 210, or sent to the data store 108. In this example, the prediction analyzer 400 loads a predicted value of 50% from the data store 108, based on time represented by the timestamp of the input data. It will be appreciated by one of skill in the art that blocks 406 and 408 can be performed in reverse order without affected the outcome of the prediction analyzer 400. In some embodiments, for example embodiments running in a multi-processor environment, blocks 406 and 408 can be performed simultaneously.

The prediction analyzer 400 illustrated by FIG. 4 then moves to block 410, where it compares the input value to the predicted value and observes a relationship between the two. When observing a relationship between the input data and the predicted value, the prediction analyzer 400 may evaluate the difference between the predicted value and the input data. In this example, the prediction analyzer 400 observes the difference between the input value of 70% and the predicted value of 50%, which is a difference of 20 units. The observed relationship can be an integer or decimal value representing the difference. When the relationship between the input data and the predicted value is observed, it can be stored in memory 210, a processor register, cache, the data store 108, etc.

The prediction analyzer 400 then moves to decision block 412, where it determines whether the input value falls outside of the tolerable range of variance when compared to the predicted value. In some embodiments, the prediction analyzer 400 does this by determining whether the difference between the input value and the predicted value, observed as described above with respect to block 410, is within the tolerable range of variance, determined as described above with respect to block 406. In one embodiment, a difference is within the tolerable range of variance if it is less than the tolerable range of variance, because the tolerable range of variance represents the maximum permitted difference between the input value and the predicted value. In this example, the difference between the input value and the predicted value is 20 units, and the tolerable range of variance is 10 units. Therefore, the input falls outside the tolerable range of variance when compared to the predicted value, which may indicate an anomaly.

If the observed relationship is not an allowed relationship, the prediction analyzer 400 then moves to block 414, in which a notification of a detected anomaly may be issued. For example, a notification of anomaly detection may be issued to a system administrator, another system, etc. In some embodiments, the notification function can be turned on or off dynamically, based on environmental variables, information in the data store 108, how far outside the permitted relationship the input data is, etc. In other embodiments, notifications may be sent on a detection-by-detection basis or sent in association with multiple anomaly detections that have been aggregated together based on type, time period, severity, degree of deviation, etc. One skilled in the art will appreciate that the notification may take a variety of forms, such as an email or other electronic message, pop-up window, dashboard control, error report, etc. without departing from the scope of the present disclosure.

If the relationship observed between the input data and predicted value is an allowed relationship, or if the notification step of block 414 has completed, the prediction analyzer 400 then moves to block 416, where it can store the results of this execution of the prediction analyzer in the data store 108 for future use or review. In some embodiments, the results are stored in memory 210. Whether and how the results are stored can be determined dynamically, based on environmental variables, the value of the input data, the result of the comparison with the reference value, and the like. Finally, at block 418 the prediction analyzer 400 ends.

Figure 5:
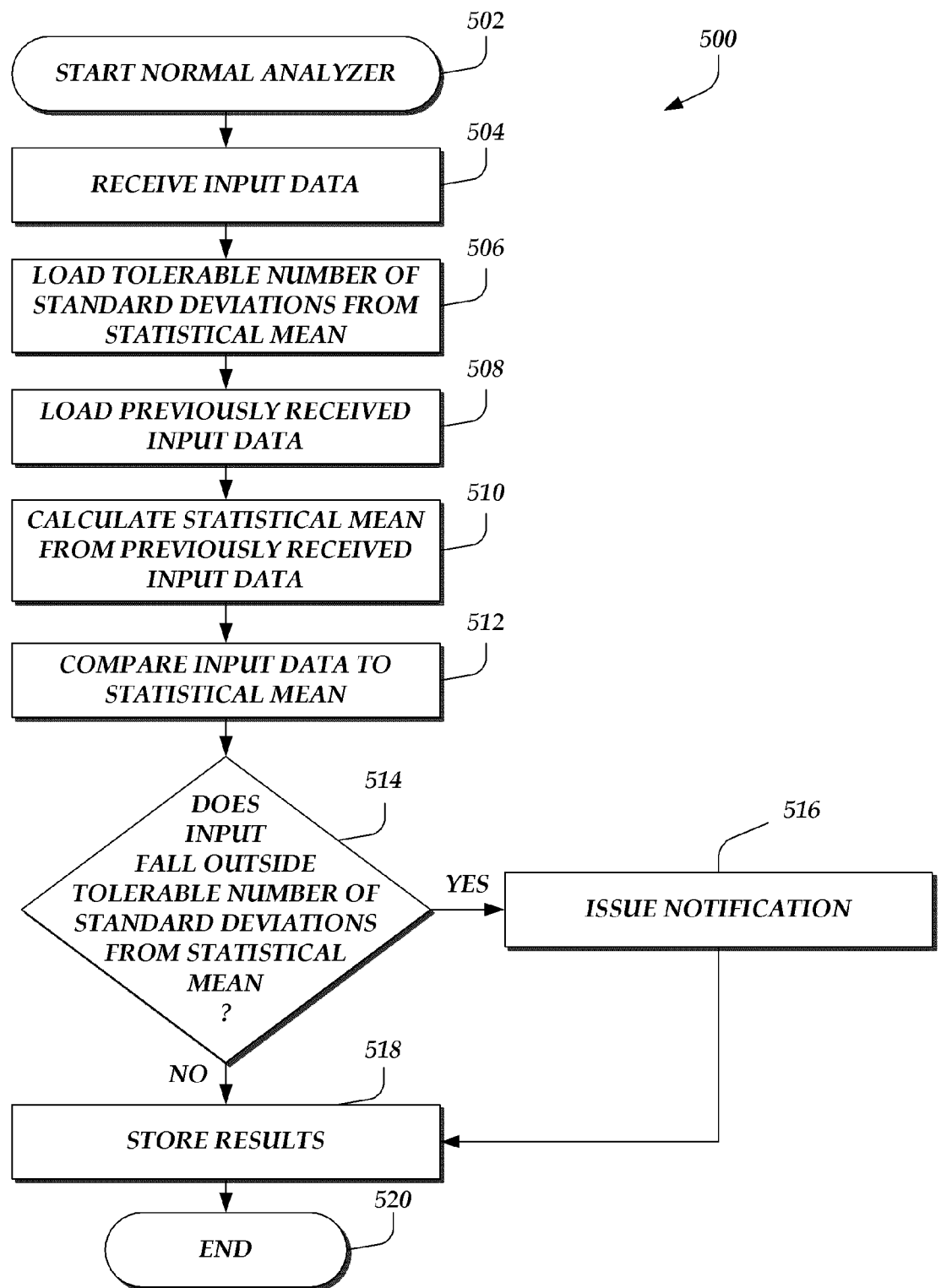
FIG. 5 is a flow diagram of an illustrative routine implemented by the metric analyzer module to determine whether a measurement of an operating parameter of a monitored metric source provides statistical evidence that the monitored metric source is operating outside the acceptable operating range.

FIG. 5 illustrates an embodiment of another type of metric analyzer, which may be referred to as a normal analyzer. In this embodiment, the metric analyzer module 120 may implement the normal analyzer 500 to determine the relationship of input data to the statistical mean of a set of input data previously received by the anomaly detection server 102. Accordingly, the normal analyzer 500 described below can be used to detect when a particular operating parameter is a statistical outlier and therefore indicative of a possible anomaly. Moreover, the normal analyzer 500 can be used to derive the expected measurement and the acceptable range of variance dynamically, providing monitoring that is responsive to any number of variables which may have been unknown to an administrator when initially configuring the analyzer.

The normal analyzer 500 starts at block 502 and proceeds to block 504. At block 504, the normal analyzer 500 receives input from a monitored metric source 106. Similar to the prediction analyzer 400 described above, the input to the normal analyzer 500 of FIG. 5 consists of an input value representing a measurement of an operating parameter. The input data also includes a timestamp representing the time when the measurement was taken. The input data can be stored in a processor register or cache, sent to memory 210, or stored in the data store 108. In this example, the input data contains a timestamp and a value of 70%, which is a measurement of the monitored metric source's 106 CPU utilization at the time represented by the timestamp.

The normal analyzer 500 then proceeds to block 506 where it loads the tolerable number of standard deviations from the statistical mean. The tolerable number of standard deviations represents the permitted relationship between the input value and the statistical mean. An observed difference between the input value and the statistical mean that is greater than the tolerable number of standard deviations may indicate than the monitored metric source 106 is experiencing an anomaly. In some embodiments, the tolerable number of standard deviations can be calculated dynamically based on environmental variables such as date and time, loaded from the data store 108, calculated from data loaded from the data store 108, and the like.

The normal analyzer 500 then proceeds to block 508, where it loads previously received input data, such as input data received in block 504 of FIG. 5, block 404 of FIG. 4, and block 304 of FIG. 3. In some embodiments, the previously received input data represents previous measurements of the same operating parameter of one or more monitored metric sources 106. In this example, the previously received input data can be CPU utilization measurements from the same monitored metric source 106 that sent the input data received in block 504. In some embodiments, prior inputs received from other monitored metric sources 106 meeting some predetermined or dynamically-determined criteria can be included in the data set. In yet other embodiments, a time period can be programmed into the metric analyzer module 120, limiting the data set to a specific, pre-determined time period. It will be appreciated that the time period can be determined dynamically, based on environmental variables, outside information, such as the current date or time of day, data store within the data store 108, etc. Once the proper time period and scope of applicable prior input data are determined, all (or a subset of) entries within this data set can be loaded from the data store 108.

The normal analyzer 500 then proceeds to block 510. The anomaly detection server 102 determines the reference value, which in this case is the statistical mean. The statistical mean can be calculated from the loaded data set, using techniques that are known in the art. These techniques can include elimination of certain outliers, and the like. Once calculated, the statistical mean value can then be stored in a processor register or cache, sent to memory 210, or sent to the data store 108. The anomaly detection server 102 then determines range of a standard deviation from the reference value. This range is used in conjunction with the allowable number of standard deviations from the mean, as determined in block 506. In some embodiments, other analytical properties of data sets can be used as the reference value in place of the statistical mean, such as the median. In some embodiments, a rate of change from previously processed input data, an area under the curve of a function derived from prior input data, and the like may be used as a reference value.

The normal analyzer 500 illustrated by FIG. 5 then moves to block 512, where it compares the input data to the statistical mean. More specifically, in one embodiment, the normal analyzer 500 observes the relationship between the input data and the statistical mean. When observing a relationship between the input data and the statistical mean, the normal analyzer evaluates the difference between the input data and the statistical mean. The observed relationship can be an integer or decimal value representing the difference. When the relationship between the input data and the predicted value is observed, it can be stored in memory 210, a processor register, cache, the data store 108, etc.

The normal analyzer 500 then moves to decision block 514, where the normal analyzer 500 determines whether the input data falls outside the tolerable number of standard deviations from the statistical mean. The relationship observed in block 512, which in this example is the numerical difference between the input data and the statistical mean, is compared to the product of the tolerable number of standard deviations multiplied by the range of the standard deviation (calculated in block 510 and described above) to determine whether the input data is outside the tolerable number of standard deviations. For example, if the statistical mean of previously received CPU utilization measurements as calculated in block 510 is 50%, and the range of a standard deviation as calculated in block 510 is 5 units, then an observed difference between the input data and the statistical mean of more than 10 units is not within the tolerable number of standard deviations if the tolerable number is two (2) standard deviations. In the same example, if the input data is observed to be less than 10 units away from the predicted value, the observed relationship is within the tolerable number of standard deviations because the input data is less than two (2) standard deviations from the mean. This information may be useful in determining whether a particular operating parameter is within normal operating range. For example, if the monitored metric source's 106 central processing unit (CPU) is running at 70% utilization and the mean utilization for this date and time is only 50%, an anomaly may have occurred. It may be entirely dependent on the standard deviation of the prior input data set, and the number of standard deviations from the mean that are allowed. A 20% difference may be normal, or it may be three (3) or more standard deviations from the mean, indicating a possible anomaly. In some embodiments, an anomaly is only indicated after three (3) straight outlier detections, etc.

If the observed relationship is not an allowed relationship, the normal analyzer 500 then moves to block 516, in which a notification of a detected anomaly may be issued. For example, a notification of anomaly detection may be issued to a system administrator, another system, etc. In some embodiments, the notification function can be turned on or off dynamically, based on environmental variables, information in the data store 108, how far outside the permitted relationship the input data is, etc. In other embodiments, notifications may be sent on a detection-by-detection basis or sent in association with multiple anomaly detections that have been aggregated together based on type, time period, severity, degree of deviation, etc. One skilled in the art will appreciate that the notification may take a variety of forms, such as an email or other electronic message, pop-up window, dashboard control, error report, etc. without departing from the scope of the present disclosure.

If the observed relationship between the input data and the calculated mean value is an allowed relationship, or if the notification step of block 516 has completed, the anomaly detection server 102 then moves to block 518, where it can then store the results of this execution of the normal analyzer in the data store 108 for future use or review. In some embodiments, the results can be stored in memory 210. Whether and how the results are stored can be determined dynamically, based on environmental variables, the value of the input data, the result of the comparison with the statistical mean value, and the like. The normal analyzer 500 then proceeds to block 520 where it terminates.

It will be appreciated that the analyzers described above are merely illustrative, and that any number of methods or analyzers are possible for detecting anomalies with departing from the scope of the present disclosure. For example, a method analyzing the rate of change of the measurements over time may be useful to alert administrators of possible system overload. Such a rate of change method may be referred to as a rate of change analyzer. In such an implementation, the anomaly detection server 102 receives a plurality of measurements from a monitored metric source 106 over time and stores them, for example in the data store 108. During each invocation of the method, the anomaly detection server 102 loads a set of data from the data store 108, such as a timeframe-specific data set as described above with respect to FIG. 5. Using this prior data set, and in some cases including the input data received during the current invocation of the method, the metric analyzer module 120 of the anomaly detection server 120 can derive a function that approximates the measurement values over time, such as a function $f(x)$ that can be visualized by a line or a curve on a Cartesian coordinate plane. The derivative $f'(x)$ of the function $f(x)$ can be derived, and will be a function that describes the rate of change of the function $f(x)$ over time. One skilled in the art will appreciate the required instructions that must be implemented by the metric analyzer module 120 to derive functions $f(x)$ and $f'(x)$, and therefore they will not be described further in this disclosure. The metric analyzer module 102 can use the derivative function $f'(x)$ to determine the reference value with which the input data will be compared. The tolerance level can be predetermined or dynamically calculated as described in detail above. The metric analyzer module 120 can then observe a relationship between the input data and the reference value, for example a simple mathematical difference between the two. If this observed relationship is not an allowed relationship—if the mathematical difference between the input data and the reference value is greater than the tolerance level—the metric analyzer module 120 can then determine whether to issue a notification to report the anomaly as described in detail above with respect to FIG. 5.

An alternative implementation to the rate of change analyzer described above can include calculating the area under the curve or line represented by the function $f(x)$. The area can then be used as the reference value, and the tolerance value can be determined using any of the techniques described above. Such an implementation may be useful for determining the sum total of changes in the input data.

It will be appreciated that other statistical and analytical techniques can be applied to a set of input data consisting of a measurement and a time stamp, and that by using the framework described in detail above a number of useful metric analyzer methods can be developed consistent with this disclosure. These analytical techniques can include machine learning algorithms applied to prior input data stored in the data store 108. It will further be appreciated that these analyzers can be combined, such that the output of one analyzer is used as the input to another analyzer. The analyzers can be combined in other ways, such as by comparing the results of multiple analyzers to determine whether a majority of analyzers have detected an anomaly from the same or similar data input. In some embodiments, the results of one or more analyzers may be weighted so that when compared, the results of certain analyzers may be given more credit in the comparison than others. In yet another embodiment, two or more analyzers may be used together to ensure that the correct anomaly is being detected. For example, the prediction analyzer 400 and the normal analyzer 500 described above may be used together. In some cases, the normal analyzer 500 may indicate that a particular monitored metric source 106 is experiencing an anomaly because it is measuring far outside the normal operating range, as calculated from measurements taken from other monitored metric sources 106. In this example, it is possible that the particular monitored metric source 106 experiencing the anomaly is actually one of the only monitored metric sources 106 in the group that is not experiencing an anomaly. The prediction analyzer 400 can be used to verify that the measurement is within the acceptable range of variance from the predicted value. It is also possible for an input value to fall outside of the tolerance level and yet not be anomalous. In such cases, a user interface 800 can provide the system administrator the opportunity to override a particular application of any detection rule, as described below with respect to FIG. 8.

When a user, such as a system administrator or computing device operator or owner, desires to utilize the anomaly detection server 102 to monitor its computers, servers, or other devices, basic profile information for the user and/or its metric sources 106 may be entered into a data store 108. The basic profile information can include the user's name and contact information. Accordingly, the actual configuration of the anomaly detection server 102 may involve the creation of sets of monitored metric sources 106 to monitor. Each set, or fleet, of monitored metric sources 106 can include one or more monitored metric sources 106. Each user can utilize the anomaly detection server 102 to monitor one or more fleets. The monitored metric sources 106 assigned to each fleet can have some property in common, such as all web servers, all database servers, etc. Utilizing fleets in this way can improve the efficacy of certain metric analyzers, such as the normal analyzer 500 described above, when they are configured to compare a particular operating parameter of one monitored metric source 106 to the statistical mean value of that same operating parameter over a group of devices. If the monitored metric sources 106 each operate to perform a similar function, any performance measurements taken from a single monitored metric source 106 may have more significance when analyzed in the context of the statistical mean of all similar monitored metric sources 106 in its fleet. In some embodiments, each fleet can include entirely unrelated monitored metric sources 106, such as when a user chooses to include each computing device that it operates, regardless of geographic area, primary function, device type, or any other meaningful property.

Figure 6:
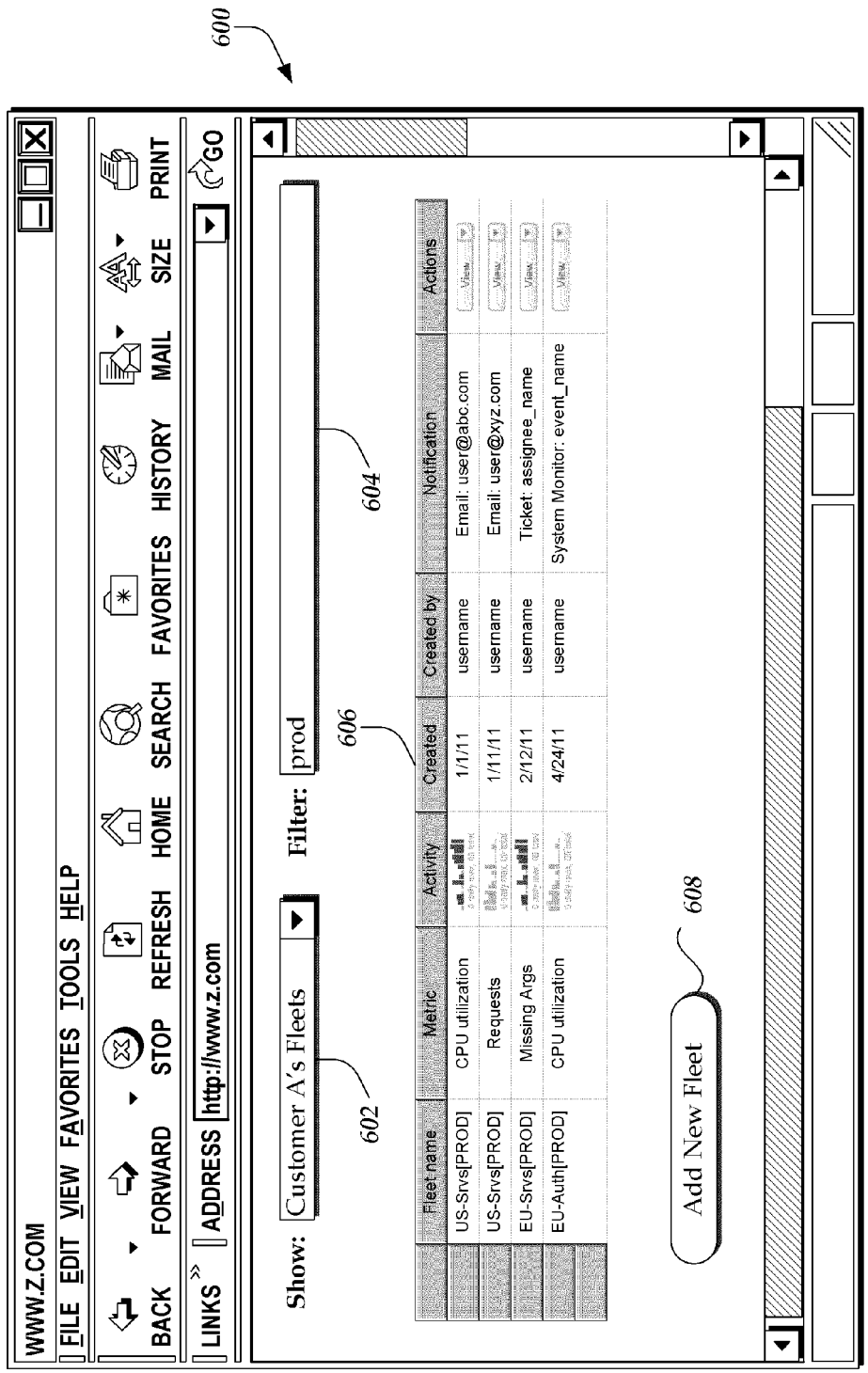
FIG. 6 is an illustrative user interface generated by the anomaly detection server that includes summary information about the metric analyzers that are assigned to the monitored metric source groups of the customers and facilitates administration of the groups.

Once basic customer data and fleet definitions are created, the actual metric analyzers are typically configured. FIG. 6 is an illustrative user interface 600 generated by the anomaly detection server 102 for configuring one or more metric analyzers assigned to a particular customer's fleets. The user interface 600 includes a customer selection field 602, a filter field 604, a data grid 606, and an add button 608. The customer selection field 602 can be a drop-down field, with a list of current customers. The filter field 604 can be a standard text field that accepts keyboard input from a user. The data grid 606 can be an interactive grid that displays data records and provides actions to take with respect to those records. The add button 608 can be an action button that redirects the user to a different interface for adding a new fleet of metric sources to be monitored for the customer selected in the customer selection field 602.

In operation, a system administrator or other user can access the user interface 600 to manage one or more metric analyzers assigned to the customers' fleets of monitored metric sources 106. The data grid 606 can display data associated with the customer selected in the customer selection field 602. The data displayed in the data grid 606 can be further limited or filtered by entering search terms in the filter field 604, such as the name of the metric analyzer, etc. One or more columns of the data grid 606 can provide action buttons or links that initiate particular functions when activated. For example, when the "view" button in the data grid 606 illustrated in FIG. 6 is clicked, the user can be redirected to a separate user interface 800, described below, which allows the user to configure the metric analyzer associated with the data in that row of the data grid 606. Those skilled in the art will appreciate the user interface 600 may have fewer, more, or different elements than those described above, and may have a different look and feel than that illustrated in FIG. 6 without departing from the scope of the present disclosure.

The user interface 600 as described above can be generated as a network resource, such as a web site sent to an administrator computing device as a file or data stream to be rendered by a browser program resident on the administrator computing device. It will be appreciated that the user interface 600 can be implemented in other ways, including a client-server configuration with a thick client resident on the administrator computing device, a text-based or command line system like those found in mainframe systems, a web service or other remote program with an exposed API for programmatic operation, and the like.

Figure 7:
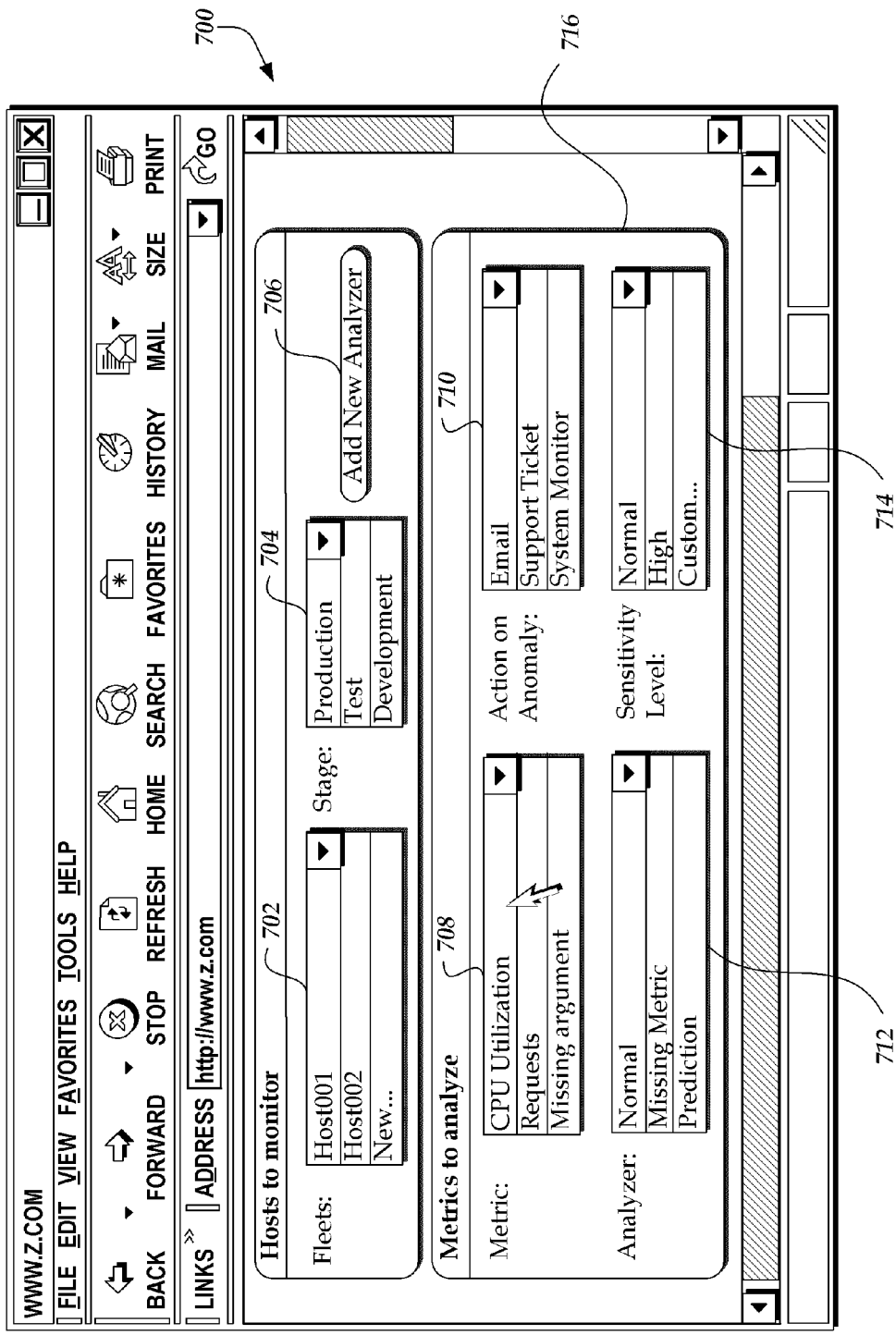
FIG. 7 is an illustrative user interface generated by the anomaly detection server that includes information about a metric analyzer assigned to a monitored metric source group's operating parameter and that facilitates configuration of the metric analyzer.

FIG. 7 is an illustrative user interface 700 for configuring metric analyzers with respect to a particular fleet. The user interface 700 may include a fleet selection field 702, a stage selection field 704, an add button 706, a metric selection field 708, an action selection field 710, an analyzer selection field 712, and a sensitivity level field 714. The fleet selection field 702 can be a drop-down field, with a list of fleets available for the current customer. The state selection field 704 can be a drop-down field with several predetermined stages, including production, test, development, and the like. The add button 706, when activated, can add another frame 716 to the user interface 700, allowing the user to configure additional metric analyzers for the fleet selected in the fleet selection field 702.

The metric selection field 708 can be a drop down field with a list of predetermined metrics for the particular type of device to be monitored. The action selection field 710 can be a drop-down field that contains a list of predetermined actions to take when an anomaly is detected. The analyzer selection field 712 can be a drop down field with several predetermined analyzers to assign to the metric selected in the metric selection field 708. The sensitivity level field 714 can be a drop down list of predetermined sensitivity levels to apply to the metric analyzer selected in the analyzer selection field 712. There can be a plurality of frames 716 on the user interface 700 to configure each of the several metric analyzers assigned to the selected fleet. Those skilled in the art will appreciate the user interface 700 may have fewer, more, or different elements than those described above, and may have a different look and feel than that illustrated in FIG. 7 without departing from the scope of the present disclosure.

In operation, a system administrator or other user can use the fleet selection field 702 to select a particular fleet to configure. When selected, any metric analyzers currently assigned to the fleet can be displayed in one or more frames 716. Stage selection field 704 can be used to select whether the fleet is a production fleet, a test fleet, etc. This can be useful because the properties of the analyzer can default to certain values based on the stage of the fleet. For example, all (or a subset of) metric analyzers assigned to fleets in the production stage can immediately send an email to the system administrator when an anomaly is detected, whereas metric analyzers assigned to fleets in the test stage can simply log the anomaly for review. Each frame 716 provides interactive fields to configure one metric analyzer assigned to the fleet selected in the fleet selection field 702. First, a particular operating parameter, or metric, can be selected in the metric selection field 708. The action in the anomaly field 710 may determine what action, if any, should be taken when an anomaly is detected. The analyzer selection field 712 can be used to select which metric analyzer is used to analyze the operating parameter selected in the metric selection field 708. For example, the normal analyzer 500 described above with reference to FIG. 5 can be configured by selecting "CPU Utilization" in the metric selection field 708 and "Normal" in the analyzer selection field 712. The options available in the sensitivity selection field 714 can change dynamically based on the selected options in the analyzer selection field 712 and metric selection field 708, and generally indicate the detection rule to be applied by the metric analyzer. In this example, a sensitivity level of "Normal" may be defined as a prediction reference value of 50% CPU utilization during peak business hours and a tolerance level of 20%. As described above, a tolerance level is one way to define the permitted relationship between the input data and the reference value. As also described above with reference to the various embodiments of metric analyzers, the components of the sensitivity level can be dynamically determined by the metric analyzer at run time, and therefore the options in the sensitivity selection field 714 can be relative rather than absolute. For example, a sensitivity of "Normal" can indicate deference to the dynamic calculations of the metric analyzer, whereas a sensitivity of "High" can indicate that the metric analyzer should narrow its calculated tolerance level by one or more standard deviations.

Like the user interface 600 described above, the user interface 700 is generated as a network resource, such as a web site sent to an administrator computing device or other device as a file or data stream to be rendered by a browser program resident on the administrator computing device. It will be appreciated that the user interface 700 can be implemented in other ways, including a client-server configuration with a thick client resident on the administrator computing device, a text-based or command line system like those found in mainframe systems, a web service or other remote program with an exposed API for programmatic operation, and the like.

Figure 8:
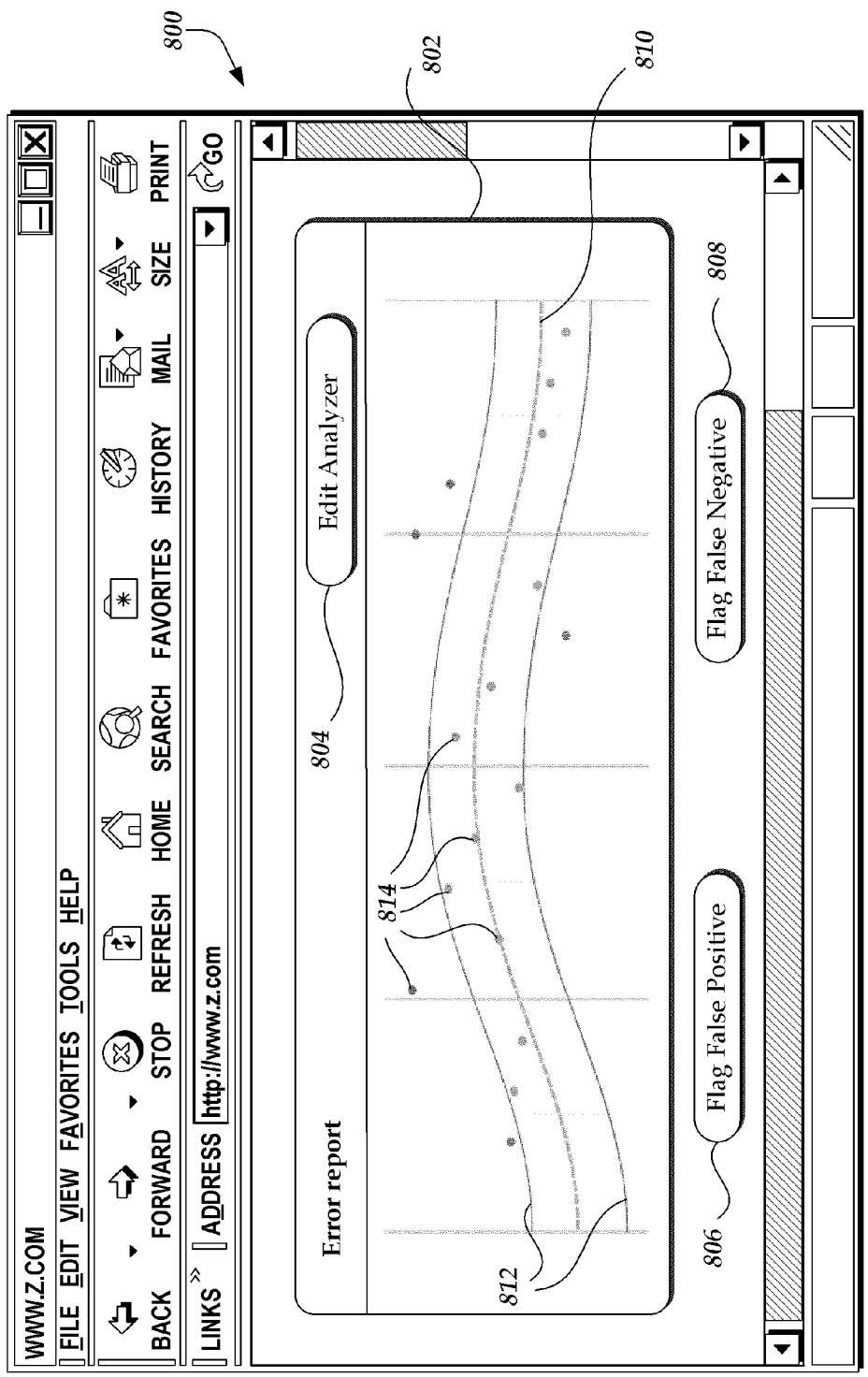
FIG. 8 is an illustrative user interface generated by the anomaly detection server that includes detailed information about the operation of a metric analyzer and that facilitates customization of the operation of the metric analyzer.

FIG. 8 is an illustrative user interface 800 for viewing results of a metric analyzer assigned to a customer's fleet, and optionally for tuning its performance. The user interface 800 may include an edit analyzer button 804, which can redirect the user to the interface 700 described above to configure the metric analyzer. The user interface 800 also includes a graph 802, which can display the results of several executions of the metric analyzer over time. Additionally, a flag false positive button 806 and a flag false negative button 808 can be provided to tune the performance of the metric analyzer. Those skilled in the art will appreciate the user interface 800 may have fewer, more, or different elements than those described above, and may have a different look and feel than that illustrated in FIG. 8 without departing from the scope of the present disclosure.

In operation, a system administrator or other user can access the user interface 800 to view data from executions of a metric analyzer over time. The data can be presented in a graph 802 that includes a reference value line 810 and tolerance level lines 812. The position of the reference value line 810 represents the reference value for metric analyzer, and the position of the tolerance level lines 812 represent the outer bounds of the tolerance level for a metric analyzer. Each input value can be represented by a data point 814, and the position of each data point 814 between or outside of the tolerance level lines 812 indicates whether that particular input value was determined to be anomalous. The system administrator can tune the sensitivity and performance of the metric analyzer by using the flag false positive button 806 and flag false negative button 808 to flag data point that erroneously indicate that a particular input data value was either anomalous or not anomalous.

Like the user interfaces 600, 700 described above, the user interface 800 may be generated as a network resource, such as a web site sent to an administrator computing device or other device as a file or data stream to be rendered by a browser program resident on the administrator computing device. It will be appreciated that the user interface can be implemented in other ways, including a client-server configuration with a thick client resident on the administrator computing device, a text-based or command line system like those found in mainframe systems, a web service or other remote program with an exposed API for programmatic operation, and the like.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase 'at least one of X, Y and Z,' unless specifically stated otherwise, is to be understood with the context as used in general to convey that an item, term, etc. may be either X, Y or Z. Thus, such conjunctive language is not generally intended to imply that certain embodiments require at least one of X, at least one of Y and at least one of Z to each be present.

Any process descriptions, elements or blocks in the flow diagrams described herein and/or depicted in the attached figures should be understood as potentially representing modules, segments, or portions of code, which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
an electronic data store that stores one or more reference value definitions and one or more permitted relationship definitions, wherein at least one reference value definition and at least one permitted relationship definition are associated with a monitored metric source, and wherein the permitted relationship definition represents a permitted relationship to the reference value; and
a computing device in communication with the electronic data store, the computing device operative to at least:
receive input data for the monitored metric source, the input data comprising a time stamp and a data value, wherein the data value represents an operating property of the monitored metric source at a point in time represented by the time stamp;
apply the at least one permitted relationship definition associated with the monitored metric source to the input data received for the monitored metric source, wherein applying the at least one permitted relationship definition comprises:
determining a function that approximates, as a function of time, a rate of change in a plurality of data values representing the operating property at different points in time;
determining a reference value satisfying the reference value definition, wherein the reference value is based at least partly on an area under a curve of the function, the area under the curve corresponding to a sum total of changes in the operating property over a time period;
determining a current rate of change of the operating property based at least partly on the input data;
observing a relationship between the current rate of change and the reference value; and
comparing the observed relationship to the permitted relationship represented in the permitted relationship definition in order to detect an anomaly in the monitored metric source; and issue an electronic anomaly notification when the observed relationship is not a permitted relationship.

2. The system of claim 1, wherein the computing device is further operative to at least generate for display a user interface that presents a result of applying the at least one permitted relationship definition.

3. The system of claim 2, wherein the user interface further presents one or more controls that enable a user to modify the at least one permitted relationship definition.

4. The system of claim 2, wherein the user interface further presents one or more controls that enable a user to associate and disassociate the at least one reference value definition and the at least one permitted relationship definition with the monitored metric source.

5. A computer-implemented method comprising:
as implemented by one or more computing devices configured with specific executable instructions,
receiving a plurality of data inputs, wherein individual data inputs of the plurality of data inputs comprise a time stamp and a data value, and wherein the data value represents an operating property, at a point in time represented by the time stamp, of a monitored metric source;
deriving a function that approximates the data values of the plurality of data inputs as a function of the time stamps of the plurality of data inputs;
determining a derivative of the function that approximates the data values;
determining an expected change in the operating property based at least in part on an area under a curve of the derivative, wherein the area under the curve of the derivative corresponds to a sum total of changes in the data values over a time period;
determining a current change in the operating property based at least partly on an additional data input;
determining at least one permitted relationship to the expected change;
observing a relationship between the current change and the expected change; and
determining whether the observed relationship satisfies the at least one permitted relationship.

6. The computer-implemented method of claim 5, where observing the relationship between the current change and the expected change comprises comparing the current change to the expected change.

7. The computer-implemented method of claim 5, wherein the at least one permitted relationship comprises a percentile range.

8. The computer-implemented method of claim 5, wherein the at least one permitted relationship comprises at least one of: less than the expected change, or greater than the expected change.

9. The computer-implemented method of claim 5, wherein the at least one permitted relationship comprises a numerical difference from the expected change.

10. The computer-implemented method of claim 5, wherein the at least one permitted relationship comprises equality with the expected change.

11. The computer-implemented method of claim 5, wherein the at least one permitted relationship comprises inequality with the expected change.

12. The computer-implemented method of claim 5, wherein the expected change is a predicted value.

13. The computer-implemented method of claim 5, further comprising issuing an electronic anomaly notification when the observed relationship does not satisfy the at least one permitted relationship.

14. A computer-readable, non-transitory storage medium having computer-executable components for analyzing input data, the computer-executable components comprising:
a first module that receives input data associated with a monitored metric source, the input data comprising a time stamp and a data value, wherein the data value represents an operating property, at a point in time represented by the time stamp, of the monitored metric source;
a second module that analyzes the input data, wherein the analyzing comprises:
determining a function that approximates, as a function of time, a rate of change in a plurality of data values representing the operating property at different points in time;
determining an expected change in the operating property based at least partly on an area under a curve of the function, the area under the curve corresponding to a sum total of changes in the operating property over a time period;
determining a current change in the operating property based at least partly on the input data;
determining whether the current change satisfies a permitted relationship with respect to the expected change; and
detecting an anomaly when the current change does not satisfy the permitted relationship with respect to the expected change.

15. The computer-readable, non-transitory storage medium of claim 14, wherein the first module further stores received input data associated with a monitored metric source in an electronic data store.

16. The computer-readable, non-transitory storage medium of claim 14, wherein the second module issues an electronic notification when an anomaly is detected.

17. The computer-readable, non-transitory storage medium of claim 14, further comprising a user interface component that causes display of a user interface presenting information associated with the monitored metric source, wherein the user interface includes one or more controls that enable a user to modify the permitted relationship with respect to the expected change.

18. The computer-readable, non-transitory storage medium of claim 14, wherein the expected change is a predicted value, and wherein the second module analyzes the input data and detects an anomaly when the current change does not satisfy the predicted value.

19. The computer-readable, non-transitory storage medium of claim 14, wherein the expected change is a rate of change in input data over time, and wherein the second module analyzes a set of input data and detects an anomaly when an observed rate of change in the data values of the set of input data do not satisfy the expected change.

20. A system comprising:
an electronic data store that stores input data received for one or more monitored metric sources; and
a computing device in communication with the data store, the computing device operative to at least:
receive a plurality of data inputs for at least one monitored metric source, wherein individual data inputs of the plurality of data inputs comprise a time stamp and a data value, wherein the data value represents an operating property of the at least one monitored metric source at a point in time represented by the time stamp;
determine a function that approximates, as a function of time, a rate of change in the plurality of data inputs;

determine an expected change in the operating property based at least in part on an area under a curve of the function, the area under the curve corresponding to a sum total of changes in the operating property over a time period;

determine a current change in the operating property based at least partly on an additional data input;

compare the current change to the expected change; and detect an anomaly when the current change does not satisfy a permitted relationship with respect to the expected change.

21. The system of claim 20, the computing device being further operative to at least issue an electronic notification when the anomaly is detected.

22. The system of claim 20, the computing device being further operative to at least receive input data for a fleet of monitored metric sources.

23. The system of claim 22, the computing device being further operative to at least determine a permitted relationship with respect to an expected change for an operating property of the fleet of monitored metric sources.

24. The system of claim 23, the computing device being further operative to at least detect an anomaly when a current change of input data received for one or more monitored metric sources in the fleet of monitored metric sources does not satisfy the permitted relationship with respect to the expected change for the operating property of the fleet of monitored metric sources.

* * * * *